(No Model.)

J. C. SATTES.
BOOM HITCH AND LOOP SWING.

No. 542,503. Patented July 9, 1895.

Attest.
Edw. A. Duvall, Jr.
D. P. Moore.

John C. Sattes,
Inventor.
by Wm. J. Moore,
Atty.

UNITED STATES PATENT OFFICE.

JOHN C. SATTES, OF ST. ALBANS, WEST VIRGINIA, ASSIGNOR OF ONE-HALF TO P. R. R. M. SATTES, OF WASHINGTON, DISTRICT OF COLUMBIA.

BOOM-HITCH AND LOOP-SWING.

SPECIFICATION forming part of Letters Patent No. 542,503, dated July 9, 1895.

Application filed November 22, 1894. Serial No. 529,649. (No model.)

*To all whom it may concern:*

Be it known that I, JOHN C. SATTES, a citizen of the United States of America, residing at St. Albans, in the county of Kanawha and State of West Virginia, have invented certain new and useful Improvements in Boom-Hitches and Loop-Swings, of which the following is a specification, reference being had therein to the accompanying drawings.

My invention relates to improvements in boom-hitches and loop-swings; and the object of my invention is a provision of a boom adapted to be secured to the cribs or piers, and so arranged and constructed as to distribute the strain caused by the contact of the logs equally upon all portions of the boom, and thus prevent the cribs or piers from being torn away as is the case with the booms now in use.

Another object of my invention is a provision of a boom which will be attached to the cribs or piers in such manner as to have a swinging movement and which may be readily disconnected in any of its parts when found necessary.

Another object of my invention is a provision of a boom having a series of swinging loops connected to the piers in a manner to properly distribute the strain thereon, which boom will be of durable and inexpensive construction.

To attain the desired objects the invention consists of a boom having a peculiar form of hitch and swing, and also in the details of construction and combination of parts, substantially as disclosed herein.

Figure 1:
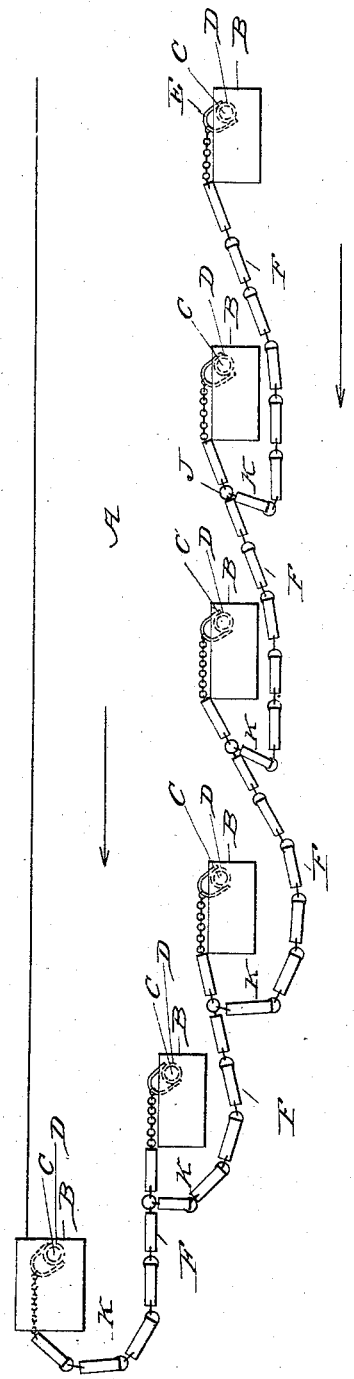
Figure 2:
Figure 3:
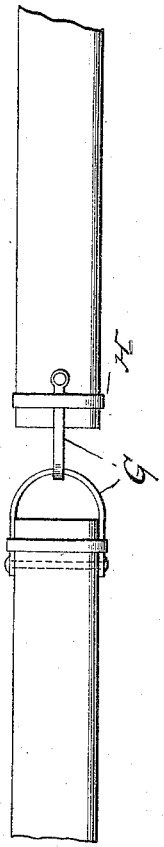

Figure 1 represents a diagrammatic view of my improved boom in position in the stream and attached to the piers. Fig. 2 is a detail view showing the connection at the loop, and Fig. 3 is a detail view of the connections between the sections of the boom.

In the drawings, A designates the stream with the current flowing in the direction indicated by the arrows, and B designates the piers arranged in the stream. In this instance I have shown the piers as vertical posts; but I would have it understood that I propose to use my boom in connection with a pier of any construction or with what is better known as a "crib." On each of the piers I secure a post C, each having around it a ring or band D, to which is connected a link E, and to said link is connected the series of sections F. These sections are made of logs or pieces of wood having their ends connected by the U-shaped links G, which links are secured by the rings or bands H, and the links are detachably connected by the rods or bolts I. The sections of the boom are connected at one end to the swinging links on the inner side of the posts, and thence pass above the upper side of the next lower pier and have the other end connected to the ring J, provided in each of the boom-sections a short distance from its connection at the pier, this construction forming a series of swinging loops K on the lower side of each pier.

From the manner of attaching my boom and from its peculiar construction it will be understood that when the logs contact with the boom they will be carried into the loops, which, having a swinging movement, will respond to the movement of the logs and carry them into the loops and cause them to pack around the piers and distribute the strain equally to all parts of the piers and prevent breakage to any of the parts.

I claim—

1. The combination of the piers anchored in the stream, the booms each having one end connected to the inner side of one of the piers and passed around the next pier and having the other end connected to the next boom section and forming a series of loops at each side of the piers to receive the logs.

2. The combination of the piers, the posts thereon, the bands or rings on said posts, the booms made in sections having their ends connected by loops or staples, and each of said booms having one end connected to the rings and passed around the next pier and having the other end connected to the next boom section, forming a loop at each pier.

In testimony whereof I affix my signature in presence of two witnesses.

JOHN C. SATTES.

Witnesses:
HENRY V. SATTES,
S. T. TEAYS.